No. 630,212. Patented Aug. 1, 1899.
T. H. FURLOW.
MOLDING MACHINE.
(Application filed June 8, 1897. Renewed May 18, 1899.)
(No Model.) 5 Sheets—Sheet 2.

No. 630,212. Patented Aug. 1, 1899.
T. H. FURLOW.
MOLDING MACHINE.
(Application filed June 8, 1897. Renewed May 18, 1899.)

(No Model.) 5 Sheets—Sheet 3.

Witnesses:
H. B. Hallock
J. J. Williamson

Inventor:
Thomas H. Furlow
by Geo. H. Holgate
Attorney

No. 630,212. Patented Aug. 1, 1899.
T. H. FURLOW.
MOLDING MACHINE.
(Application filed June 8, 1897. Renewed May 18, 1899.)

(No Model.) 5 Sheets—Sheet 4.

Witnesses:
H. B. Hallock
S. S. Williamson

Inventor:
Thomas H. Furlow
by Geo. H. Holgate
Attorney.

THE NORRIS PETERS CO., PHOTO-LITHO., WASHINGTON, D. C.

No. 630,212. Patented Aug. 1, 1899.
T. H. FURLOW.
MOLDING MACHINE.
(Application filed June 8, 1897. Renewed May 18, 1899.)
(No Model.) 5 Sheets—Sheet 5.

Witnesses:
H. B. Hallock.
S. S. Williamson.

Inventor:
Thomas H. Furlow
by Geo. H. Holgate
Attorney.

UNITED STATES PATENT OFFICE.

THOMAS H. FURLOW, OF PHILADELPHIA, PENNSYLVANIA.

MOLDING-MACHINE.

SPECIFICATION forming part of Letters Patent No. 630,212, dated August 1, 1899.

Application filed June 8, 1897. Renewed May 18, 1899. Serial No. 717,289. (No model.)

*To all whom it may concern:*

Be it known that I, THOMAS H. FURLOW, a citizen of the United States, residing at Philadelphia, in the county of Philadelphia and State of Pennsylvania, have invented a certain new and useful Improvement in Molding-Machines, of which the following is a specification.

My invention relates to a new and useful improvement in molding-machines, and has for its object to so construct a machine of this description as to render the operations of molding exceedingly simple and accurate and avoid the breaking or chipping of the mold-sand when the patterns are withdrawn therefrom and also to save much time and labor in accomplishing the desired results.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
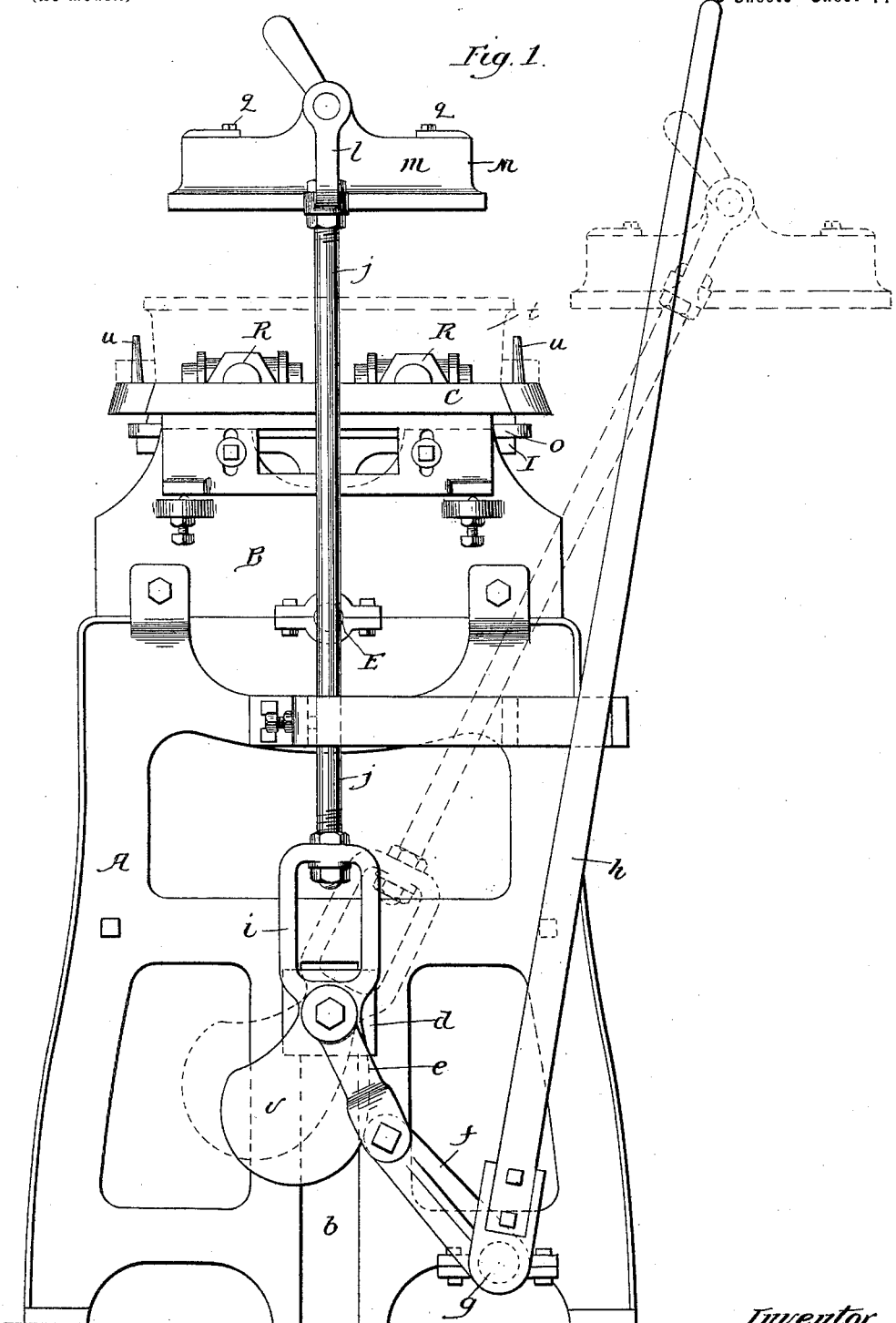
Figure 2:
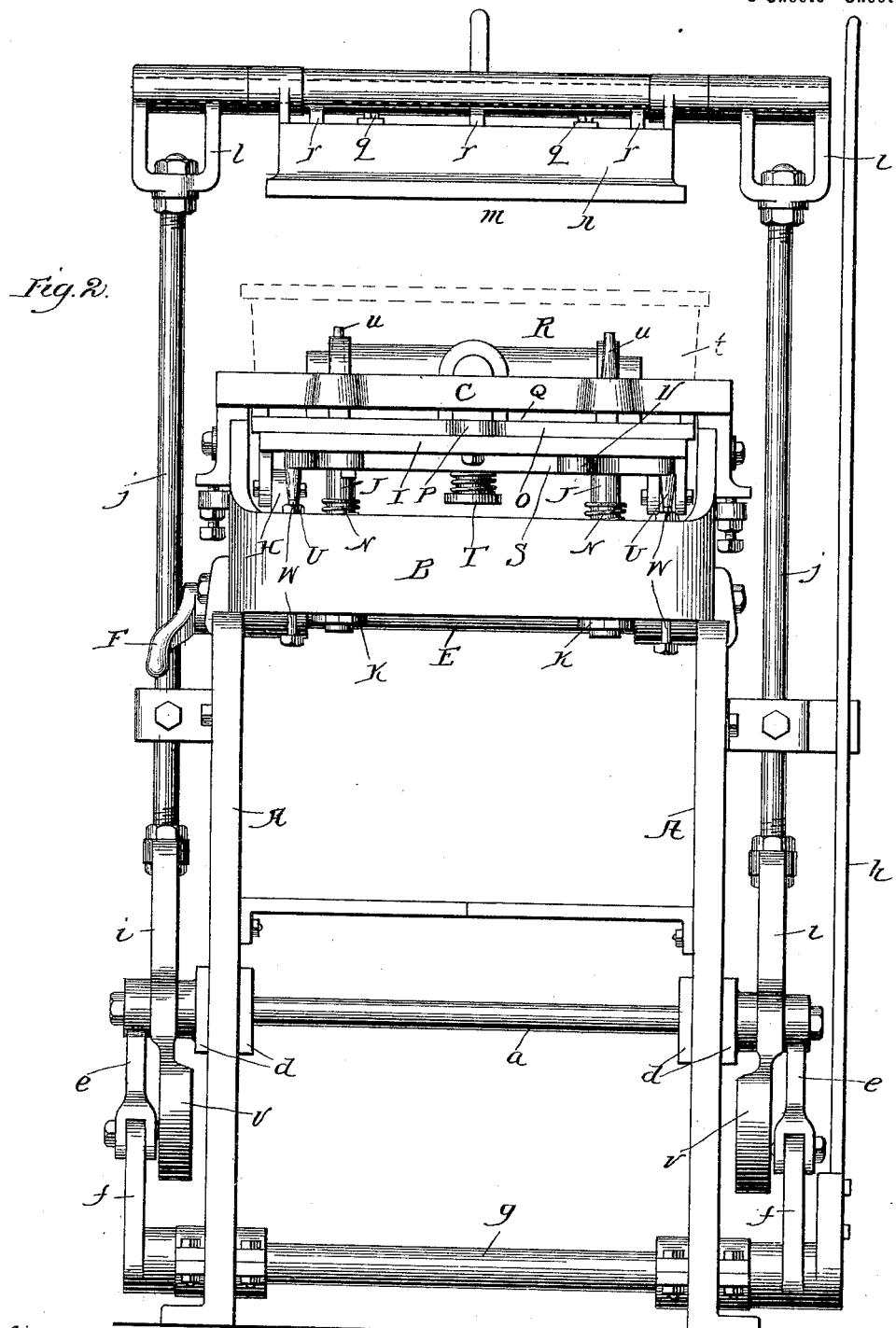
Figure 3:
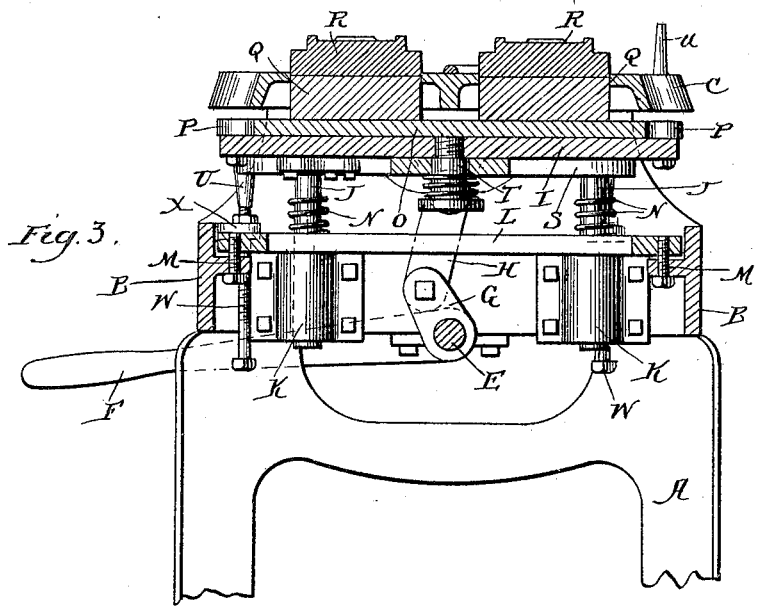
Figure 4:
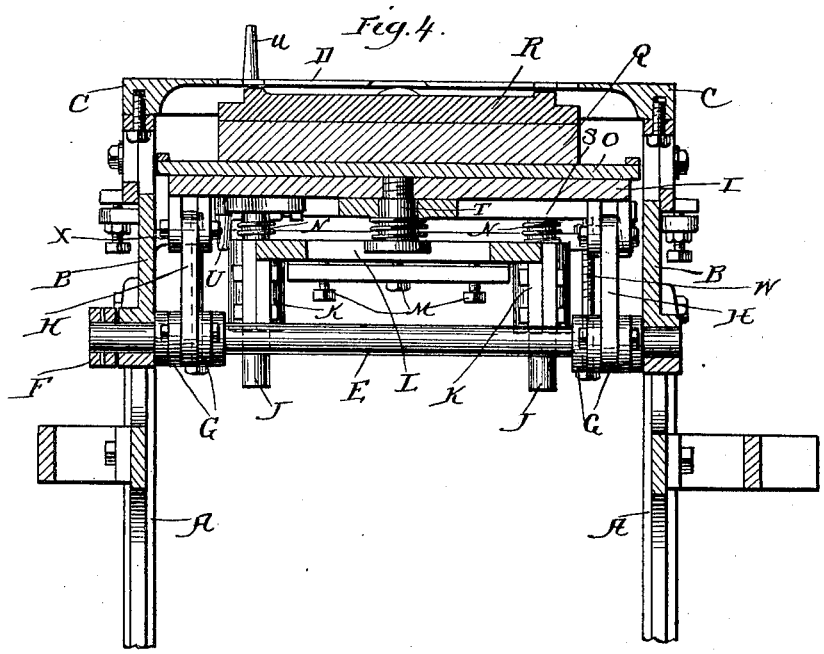
Figure 5:
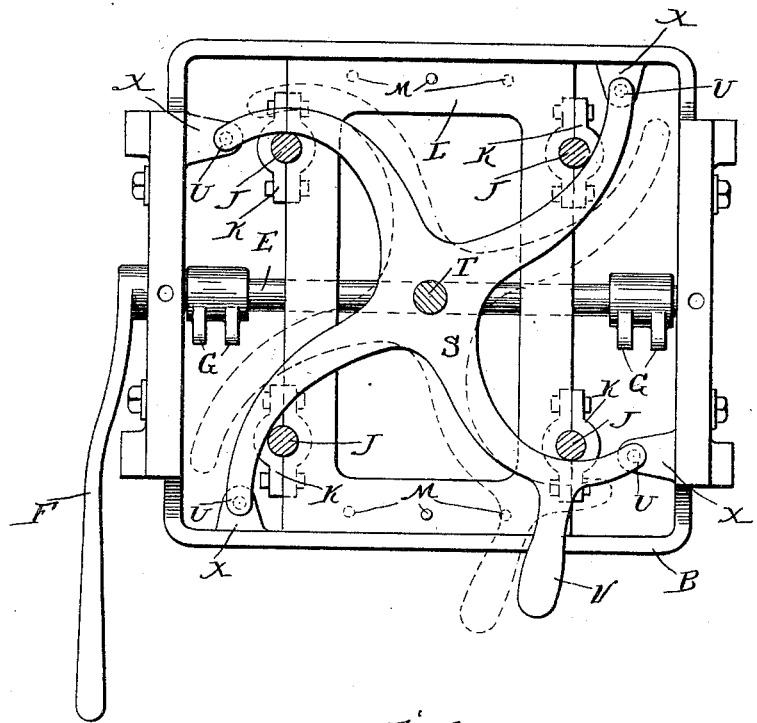
Figure 6:
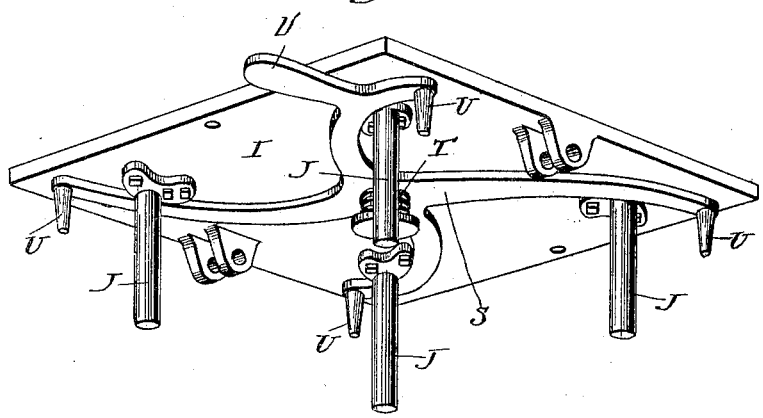
Figure 7:
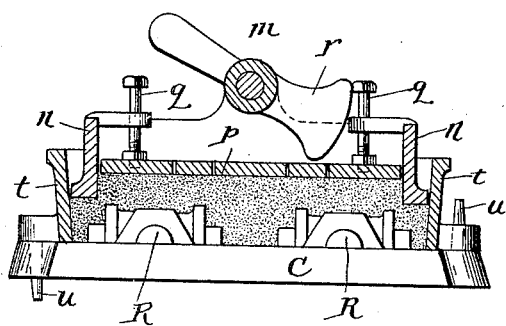
Figure 8:
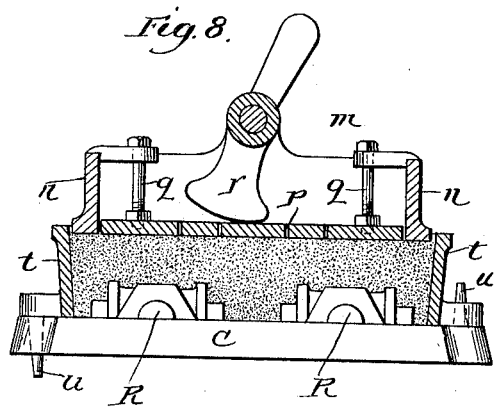
Figure 9:
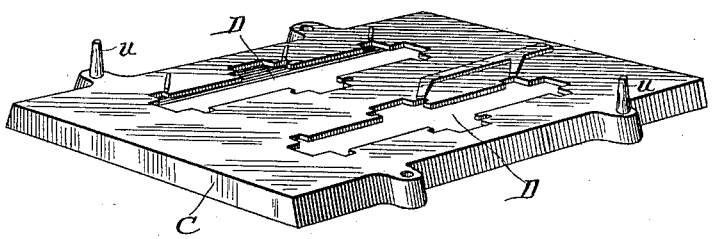
Figure 10:
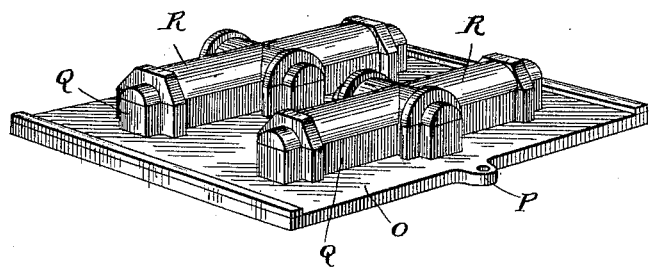

Figure 1 is an end elevation of a molding-machine made in accordance with my improvement; Fig. 2, a front view thereof; Fig. 3, a section of the operating parts of the machine, showing the patterns in position for the reception of the flask and sand; Fig. 4, a section taken at right angles to Fig. 3, but showing the pattern and parts for supporting the same moved downward out of action; Fig. 5, a plan view of the upper portion of the machine, the match-board and pattern-plate being removed; Fig. 6, a perspective of the plunger-plate looking upon the under side thereof; Fig. 7, a section of a flask made in accordance with my improvement and showing the patterns therein with the ramming mechanism in position to tuck the sand; Fig. 8, a similar view showing the ramming mechanism in position to compress the sand uniformly; Fig. 9, a perspective of the match-plate; and Fig. 10, a similar view of the pattern-plate, showing the patterns mounted upon suitable chairs thereon.

In carrying out my invention as here embodied I provide a suitable framework A, which is here shown as being the shape of a stand having a head or table B mounted thereon, and this head and frame are of such design as to support the several operating parts of the machine. Upon the top of the head is mounted a match or surface plate C, which serves as a stripper, as will be hereinafter set forth, and through this plate are formed openings D, which correspond to the outline of the base of the patterns. A rock-shaft E is journaled in the frame and has secured thereon an operating-lever F, by means of which it may be oscillated, and this shaft carries the short arms G, which are connected, by means of the links H, with the plunger-plate I, said plate being adapted to slide vertically within the head of the machine, and is guided therein by means of the dependent rods J, which pass through the bearings K, from which it will be seen that this plunger may be raised or lowered by the proper manipulation of the lever F, since the short arms G and links H act as toggle-levers for bringing about this action, and when in proper relative position to each other will lock the plunger-plate in its elevated position, for the purpose hereinafter set forth.

The support-plate L is adjustably mounted upon the head by means of the screws M, passed through suitable lugs projecting inward from the head in order that the rods J may run true in their bearings K, which are formed with this plate. When the plunger is depressed, it rests upon said table, and in order that there may be no undue shock to the machine in the lowering of the plunger, which is usually accomplished by a sudden movement, springs N are coiled about the rods J and rest upon the support-plate L, so that when the plunger is depressed it will rest upon these springs, the latter acting as cushions for the reception thereof.

The pattern-plate O is provided with ears P, through which pass holes whereby it may be secured to the plunger-plate, so as to be moved vertically therewith, and upon this pattern-plate are secured suitable chairs Q, upon which in turn are mounted the patterns R, the objects of the chairs being to elevate the patterns to a sufficient extent to permit them to pass through the surface-plate D, thus projecting said patterns above said plate upon their base-lines, so as to bring about a perfect impression within the sand contained in the flask, and in order that the patterns thus elevated may be there sustained during the ramming of the sand therearound a four-armed lever S is pivoted at T to the under side of the plunger, and from the ends of these arms depend the short legs U, a handle V being also formed with the lever for its manipulation. Now when the plunger has been elevated, which is usually accomplished by forcing it above the proper line upon which it is to ultimately rest, the arms of the lever are so revolved as to bring the legs U over the upper ends of the bolts W, which are threaded through the lugs X and have jam-nuts run upon their upper ends, so as to hold them in any adjustment. Thus it will be seen that when the plunger is permitted to move downward these legs will come in contact with the ends of the bolts and serve as a support for the plunger, holding it firmly in position for the packing of the sand upon the patterns. By the adjustments of the bolts W the plunger, and consequently the pattern-plates secured thereto, may be leveled and brought into exact position.

A rod $a$ runs from side to side of the machine and passing through the slots $b$ in the lower portion of the frame is fitted to slide therein by suitable flanges and collars $d$, and this rod is connected by the links $e$ to the arms $f$, which in turn are secured upon the shaft $g$, which is journaled in the lower portion of the legs. An operating-lever $h$ is secured to one end of the shaft $g$ and extends upward within easy reach of the operator, so that by the swinging of this lever in the proper direction the rod $a$ may be raised or lowered within its slots for the purpose next set forth.

Pivoted to the rod $a$ are the yokes $i$, to which are bolted the reach-rods $j$, said rods projecting upward and being bolted to the clips $l$, which latter are pivoted to the rammer $m$. This rammer consists of a rectangular frame $n$, having a plate $p$ fitted to slide therein by means of the bolts $q$, which are passed through suitable holes in the frame, and the plate may be held in a depressed position by the cam-lever $r$, which is pivoted to the frame, or it may be permitted to assume an elevated position relative to the frame by the swinging of this lever out of action, as indicated in Fig. 7.

From the foregoing description the operation of my improvement will be obviously as follows: A pattern-plate having the proper patterns mounted thereon, as before described, is bolted to the plunger, and when ready for use the said plunger is forced upward by means of the lever F, so as to carry the patterns through the match-plate C, when they are locked in position by the proper manipulation of the lever-arms S. Now the flask $t$ is placed upon the match-plate and guided into exact relative position by the dowel-pins $u$, passing through suitable holes formed in the flask, after which the properly-prepared sand is placed around and over the patterns and a certain amount of molding-sand filled within the flask, when the rammer is swung over and brought down upon said flask and power applied to the operating-lever $h$ in such manner as to force the rammer within the flask and firmly against the sand, which will tuck the edges of the latter, thus setting it tightly against the flask and outer portions of the pattern. When this has been thoroughly accomplished, a reverse movement of the lever $h$ will elevate the rammer, as shown in full lines in Fig. 1, when more sand is introduced within the flask and the cam-lever $r$ brought into action to hold the plate $p$ flush with the lower edges of the rammer. After this it is only necessary to repeat the actions of the rammer by the operations of the lever $h$ to firmly compress the sand within the flask and around the patterns, as clearly indicated in Fig. 8. The next operation is to remove the patterns from the mold, and this is done without disturbing the flask by partially rotating the plate S and then forcing downward the lever F, which, as before described, will lower the plunger, and consequently the patterns and plate thereon. During this operation of withdrawing the patterns from the sand it will be seen that the edges of the sand are thoroughly protected against chipping by the match-plate, which acts as a stripper and permits an easy withdrawal of the patterns without in any wise injuring the mold. This feature is of great importance, since when the flask is elevated from the pattern rather than the pattern withdrawn from the flask great tendency exists to crack or chip the surface of the sand; but by my improvement no care is required upon the part of the operator to withdraw the pattern. No rapping being necessary to free it from the sand, the mold will be a true representation of the pattern and not be disturbed or injured by said rapping, as has heretofore been the case.

It has been found by the use of my improvement that a great amount of labor and time has been saved in the production of a given class of work, while at the same time the work so produced is superior in every way to that produced by the ordinary methods of molding.

The fact that the pattern-plate O is detachably secured to the plunger renders this machine capable of molding an indefinite variety, since it is only necessary to provide various patterns mounted upon suitable plates and match-plates to correspond therewith, it being noted that the match-plates are likewise detachably secured to the machine.

Any suitable weight $v$ may be formed or secured upon the yokes $i$ for the balancing of the same, thereby partly overcoming the drag which would otherwise be occasioned by the weight of the rammer.

Having thus fully described my invention, what I claim as new and useful is—

1. In combination, a suitable frame, a head mounted thereon, a plate L adjustably mounted within the head, a plunger having depending rods passing through bearings in the plate, a four-armed lever pivoted to the under side of the plunger, legs depending from said lever, adjustable bolts upon which said legs are adapted to rest when swung into active position, a pattern-plate adapted to be attached to the plunger, chairs secured upon said plate, patterns mounted upon the chairs, a match-plate secured to the top of the head and having openings therethrough for the passage of the patterns, a flask for surrounding the patterns, a packer consisting of a frame adapted to pass within the flask, a sliding plate fitted within said frame, and a cam-lever for holding said plate in position, and means for operating said packer, as specified.

2. In combination, a suitable frame, a head mounted thereon, a plate L adjustably secured within the head, a plunger, rods projecting downward from said plunger and passing through bearings in the plate, springs coiled around said rods above the plate, a rock-shaft E journaled within the head, short arms carried by said shaft, links connecting said arms with the plunger whereby the latter may be operated when the shaft is rocked, a lever F for operating said shaft, a pattern-plate detachably secured to the plunger, chairs mounted upon said pattern-plate, patterns secured to the chairs, a match-plate secured to the top of the head and having openings therethrough for the passage of the patterns, and dowel-pins projecting upward from the match-plate for the reception of the flask, all arranged substantially as and for the purpose set forth.

3. In a molding-machine of the character described, a frame, a head mounted thereon, a plate adjustably mounted in the head, a plunger having rods depending through bearings in said plate, means for leveling the plunger, patterns carried by the plunger, a match-plate secured to the top of the head, said match-plate having openings therein for the passage of the patterns, a flask surrounding the patterns, and a packer, as and for the purpose described.

4. The herein-described combination with a molding-machine, consisting of a frame having a head mounted thereon and match-plate having openings therethrough secured on the head, of an adjustable plate mounted in the head, a plunger having rods depending through bearings in said plate and means for leveling the plunger and locking it in position, as and for the purpose described.

5. In a molding-machine of the character described, a frame, a head secured thereon, a plunger having rods depending therefrom through bearings adjustably supported in the frame, a four-armed lever pivoted to the under side of the plunger, legs depending from said lever, adjusting-bolts threaded through ears on the head, said legs being adapted to rest on the bolts, as and for the purpose described.

6. In a molding-machine of the character described, a frame, a head thereon, an adjustable plate secured in the head, a plunger having rods depending through bearings in the plate, a four-armed lever pivoted to the under side of the plunger, legs depending from the arms of the lever, adjusting-bolts threaded through ears of the head, said legs being adapted to rest on said bolts, as and for the purpose described.

In testimony whereof I have hereunto affixed my signature in the presence of two subscribing witnesses.

THOMAS H. FURLOW.

Witnesses:
S. S. WILLIAMSON,
F. MATTNER.